United States Patent
Zhu et al.

(10) Patent No.: US 10,339,143 B2
(45) Date of Patent: Jul. 2, 2019

(54) SYSTEMS AND METHODS FOR RELATION EXTRACTION FOR CHINESE CLINICAL DOCUMENTS

(71) Applicant: KONINKLIJKE PHILIPS N.V., Eindhoven (NL)

(72) Inventors: Xianshu Zhu, Ossining, NY (US); Junyi Liu, Ossining, NY (US); Sheikh Sadid Al Hasan, Briarcliff Manor, NY (US); Oladimeji Feyisetan Farri, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 11 days.

(21) Appl. No.: 14/707,111

(22) Filed: May 8, 2015

(65) Prior Publication Data
US 2015/0347521 A1    Dec. 3, 2015

Related U.S. Application Data

(60) Provisional application No. 61/990,334, filed on May 8, 2014, provisional application No. 62/085,823, filed on Dec. 1, 2014.

(51) Int. Cl.
*G06F 3/00* (2006.01)
*G06F 16/2457* (2019.01)
*G06F 17/24* (2006.01)
*G06F 16/84* (2019.01)
*G06F 16/901* (2019.01)
*G06F 17/27* (2006.01)

(52) U.S. Cl.
CPC ........ *G06F 16/24573* (2019.01); *G06F 16/86* (2019.01); *G06F 16/9024* (2019.01); *G06F 17/241* (2013.01); *G06F 17/2785* (2013.01)

(58) Field of Classification Search
CPC ............. G06F 17/30525; G06F 17/241; G06F 17/2785; G06F 17/30917; G06F 17/30958; G06F 16/24573; G06F 16/86; G06F 16/9024
See application file for complete search history.

(56) References Cited

U.S. PATENT DOCUMENTS 8,370,128 B2 * 2/2013 Brun .................. G06F 17/2705 704/10
9,495,358 B2 * 11/2016 Zuev .................. G06F 17/2755
(Continued)

FOREIGN PATENT DOCUMENTS

WO    WO2011/060538    *    5/2011

OTHER PUBLICATIONS

Qui, Xipeng et al "Fudan NLP: A Toolkit for Chinese Natural Language Processing", Proceedings of Annual Meeting of the Association for Computational Linguistics, 2013, pp. 49-54.
(Continued)

Primary Examiner — Kyle R Stork

(57) ABSTRACT

Systems and methods are disclosed for extracting structured relation information from Chinese clinical notes. Structured relation information in the form of entity-feature-value (EFV) triples is disclosed. The EFV triples may be used for advanced data abstraction. An ontology-driven method for data extraction is disclosed. The ontology-driven method may include lexical and syntactic analysis followed by semantic analysis to generate the EFV triples.

17 Claims, 7 Drawing Sheets

(56) References Cited

U.S. PATENT DOCUMENTS

| | | | |
|---|---|---|---|
| 2011/0295864 A1* | 12/2011 | Betz | G06F 17/30722 |
| | | | 707/754 |
| 2013/0085954 A1* | 4/2013 | Hanneman | G06Q 10/105 |
| | | | 705/321 |
| 2014/0181128 A1* | 6/2014 | Riskin | G06F 17/30684 |
| | | | 707/756 |
| 2015/0026825 A1* | 1/2015 | Dube | G06F 21/10 |
| | | | 726/28 |
| 2015/0356202 A1* | 12/2015 | Yampolska | G06Q 30/02 |
| | | | 707/755 |

OTHER PUBLICATIONS

Zeng, Qiang et al "Extracting Clinical Information from Free-Text of Pathology and Operation Notes via Chinese Natural Language Processing", 2010 IEEE International Conf. on Bioinformatics and Biomedicine Workshops, pp. 593-597.

Garvin, Jennifer H. et al "Automatid Extraction of Ejection Fraction for Quality Measurement using Regular Expressions in Unstructured Information Management Architecture (UIMA) for Heart Failure", Journal American Medicine Informatics Association, vol. 19, 2012, pp. 859-866.

Lei, Jianbo et al "A Comprehensive Study of Named Entity Recognition in Chinese Clinical Text", Journal American Medicine Informatics Association, vol. 21, 2014, pp. 808-814.

Wang, Hui et al "Extracting Important Information from Chinese OPeration Notes with Natural Language Processing Methods", Journal of Biomedical Informatics, vol. 48, 2014, pp. 130-136.

* cited by examiner

SYSTEMS AND METHODS FOR RELATION EXTRACTION FOR CHINESE CLINICAL DOCUMENTS

CROSS REFERENCE TO PRIOR APPLICATIONS

This application claims the benefit of U.S. Provisional Patent Application No. 61/990,334, filed on May 8, 2014 and U.S. Provisional Patent Application No. 62/085,823, filed on Dec. 1, 2014, both of which are hereby incorporated by reference herein.

BACKGROUND

Electronic patient information may be represented in structured, semi-structured and/or unstructured clinical documentation. In the context of the Chinese healthcare system, similar documents are generated in large volumes during routine and emergency clinical processes. However, information retrieval from unstructured clinical documents written in Chinese can be very challenging, especially for clinical decision support and real-time knowledge discovery. Extracting information from unstructured clinical notes may be very useful for many clinical applications.

Although there have been many studies on extracting information from electronic health record (EHR) clinical documents written in English, few studies have explored using natural language processing techniques to extract information from Chinese clinical notes. There have been some research efforts on extracting structured clinical concepts from free-text clinical notes in Chinese. For example, machine learning (ML) based approaches, such as logistic regression models have been used. ML-based approaches require manually annotated datasets for training; however, generating sufficient expert-annotated data to train and test ML models can be very time-intensive and expensive. Furthermore, the performance of these ML algorithms is heavily dependent on the extent to which the expert-annotated data represents the knowledge domain of interest. For instance, a ML model trained on radiology notes may have limited performance when applied to extract information from cardiology notes. Applications using ML algorithms trained in a particular domain or sub-domain may not be extensible to other distinct knowledge areas.

SUMMARY

An example computer system for generating semantic relationships from a Chinese clinical note for information retrieval from the Chinese clinical note according to an embodiment of the disclosure may include a processor, a memory accessible to the processor, the memory may include the Chinese clinical note, a database accessible to the processor, and a display coupled to the processor, wherein the processor may be configured to: identify and annotate sections of the Chinese clinical note, identify and annotate sentences within the sections, segment the sentences into words, map the words to concepts, parse the segmented sentences for grammatical dependencies, link the concepts based, at least in part, on the grammatical dependencies to generate an entity value feature triple, based at least in part, on the grammatical dependencies, and provide to the display the entity-feature-value (EFV) triple.

An example system for extracting structured relation information from a Chinese clinical note according to an embodiment of the disclosure may include a lexical and syntactic analysis component may be included in a processor, the lexical and syntactic analysis component may include: a section annotator that may be configured to identify and annotate a section within the clinical note, a sentence annotator that may be configured to identify and annotate a sentence within the section, and a Chinese clinical word segmenter that may be configured to segment Chinese characters in the sentence into words, and a semantic analysis component may be included in the processor, the semantic analysis component may be configured to receive the sentence and words as a first data structure from the lexical and syntactic analysis component, the semantic analysis component may include: a concept mapper that may be configured to extract and map concepts from the words in the sentence to a Chinese clinical lexicon stored in a database accessible to the concept mapper, wherein the mapped concepts may be stored in a second data structure, a sentence dependency parser configured to extract a grammatical structure of the sentence, wherein the grammatical structure is stored in a third data structure, and a concept linker that may be configured to apply one or more rules to mapped concepts from the second data structure, at least in part, on the grammatical structure from the third data structure to generate an entity-feature-value (EFV) triple.

An example method of automatically extracting information from a Chinese clinical note for retrieval of relevant clinical notes from a database according to an embodiment of the disclosure may include identifying and annotating sections in the Chinese clinical note; identifying and annotating sentences in the sections; segmenting Chinese characters in the sentences into words using a Chinese clinical ontology; identifying and mapping the words to concepts using a Chinese clinical lexicon mapped to a non-Chinese clinical ontology; parsing the sentences for grammatical dependencies; linking the concepts based on the grammatical dependencies into entity-feature-value (EFV) triples.

DETAILED DESCRIPTION

Figure 1:
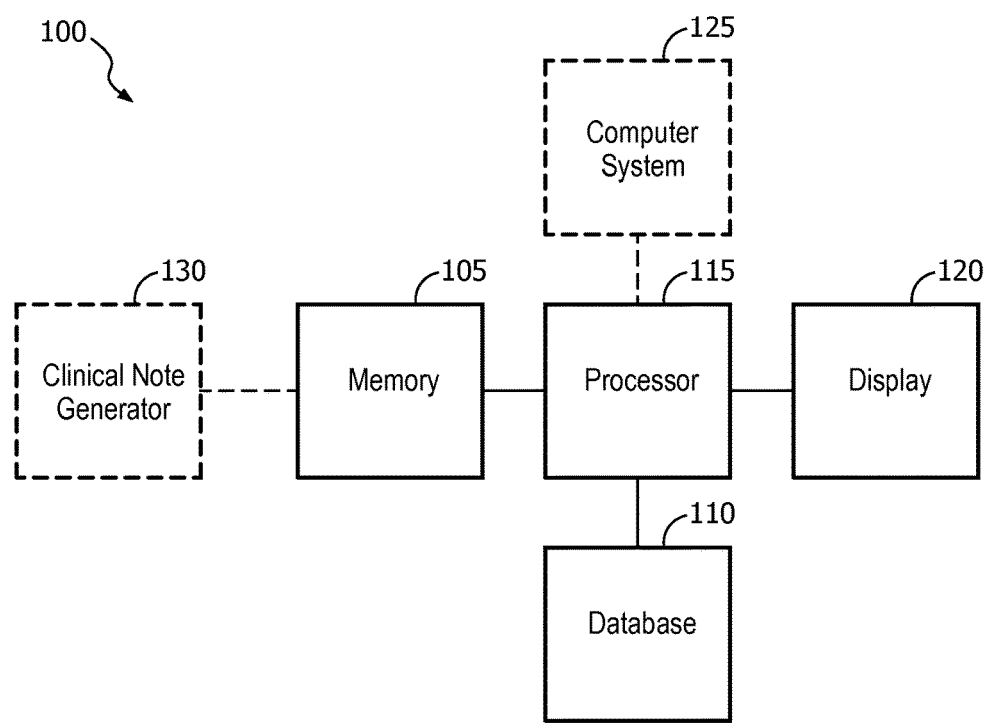
FIG. 1 is a block diagram of a system for generating clinically relevant semantic relationships from Chinese clinical notes in the form of Entity-Feature-Value (EFV) triples according to an embodiment of the disclosure.

The following description of certain exemplary embodiments is merely exemplary in nature and is in no way intended to limit the invention or its applications or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of certain features will not be discussed when they would be apparent to those with skill in the art so as not to obscure the description of the present system.

Described herein are methods and systems for generating clinically relevant semantic relationships from Chinese clinical documents in the form of Entity-Feature-Value (EFV) triples. An entity may be an anatomical structure and/or site (e.g., lower left ventricle, bicuspid valve). A feature may be a pathology and/or property of the entity (e.g., flow rate, thickness). A value may be an additional descriptor and/or measurement of the feature (e.g., normal, 12 mm, dysplastic). The EFV triples may be stored as strings, numerical values, and/or other data structures. The EFV triples may then be used as structured queries to facilitate data mining, patient outcome analysis, and/or advanced patient and population-level visualizations. The EFV triples may serve as search terms in a database which may facilitate retrieval of relevant clinical notes and/or sections of clinical notes. The EFV triples may improve clinical knowledge access. The methods and systems described herein may be utilized in other applications such as pattern recognition, question answering for improved clinical decision making, and/or better patient care.

A system may include two components: (1) a lexical and syntactic analysis component and (2) a semantic analysis component. The system may process unstructured clinical notes into more structured, actionable information by extracting clinically relevant semantic triples in the form of EFVs. Clinical notes may include clinician notes from an echocardiography (echo) exam, a stress test, a magnetic resonance imaging exam, and/or other procedure. The lexical and syntactic component may identify and annotate sections, sentences, and/or words from unstructured clinical notes. The lexical and syntactic component may perform word segmentation using a Chinese clinical ontology. The Chinese clinical ontology may provide clinically-biased word segmentation, which in some embodiments, may improve precision of word segmentation. The semantic analysis component may semantically link and map concepts between and/or within the sections, sentences and/or words received from the lexical and syntactic analysis component. The system may then output EFV triples.

A computer system 100 for generating clinically relevant semantic relationships from Chinese clinical notes in the form of Entity-Feature-Value (EFV) triples according to an embodiment of the disclosure is shown as a block diagram in FIG. 1. The clinical notes in digital form may be included in memory 105. Memory 105 may be a non-transitory computer-readable memory in some embodiments. The memory 105 may be accessible to processor 115. The processor 115 may have access to database 110. Database 110 may include one or more ontologies and/or one or more dictionaries. The processor 115 may include one or more circuits. The processor 115 may include one or more processors. The processor 115 may include one or more analysis modules for generating the EFV triples from clinical notes stored in memory 105. The processor 115 may provide the results of its analysis to a display 120, the database 110, and/or memory 105. The results of the analysis may include the EFV triples and/or additional information. Optionally, processor 115 may access a computer system 125. The computer system 125 may include additional databases, memories, and/or processors. The computer system 125 may be a part of system 100 or remotely accessed by system 100. In some embodiments, the system 100 may also include clinical note generator 130. For example, a clinician may input notes from an echocardiography (echo) exam into the clinical note generator 130, and the clinical note generator 130 may provide the echo notes to the memory 105.

Figure 2:
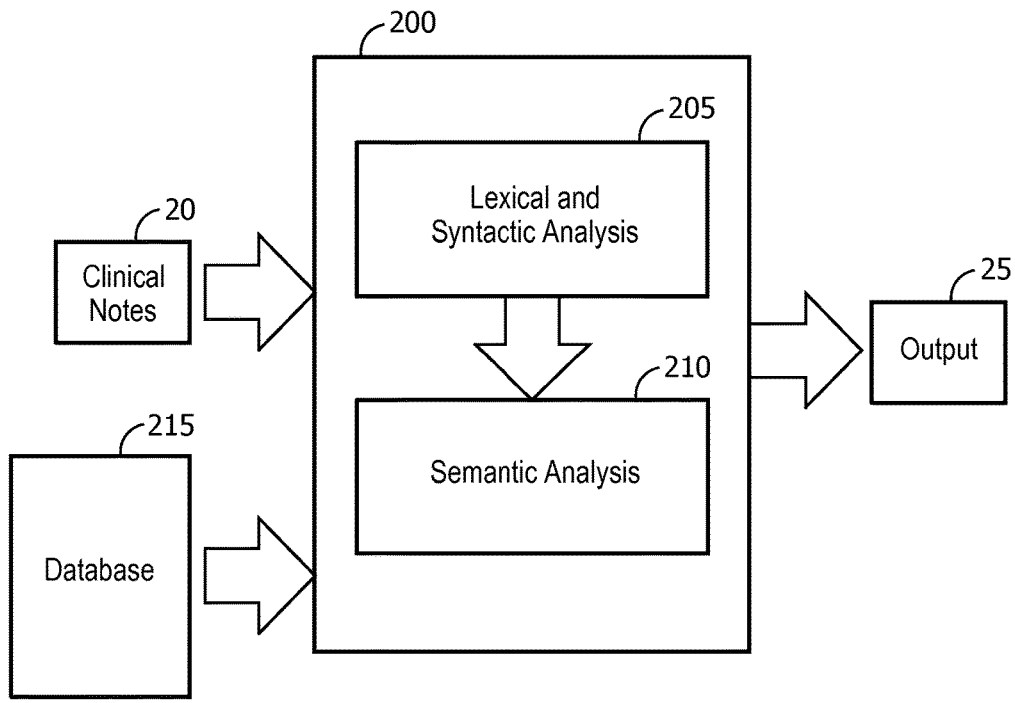
FIG. 2 is a block diagram of an analysis module according to an embodiment of the disclosure.

FIG. 2 is a block diagram of an analysis module 200 according to an embodiment of the disclosure. The analysis module 200 may be included in a processor, for example, processor 115 shown in FIG. 1. The analysis module 200 may be implemented in hardware, software, or a combination thereof operated the processor. The analysis module 200 may access a database 215. Database 215 may include a word normalization dictionary, a structured clinical ontology, an English ontology database, and/or other dictionaries, ontologies, and/or databases (e.g., cardiology ontology). Database 215 may be implemented by database 110 of FIG. 1 in some embodiments. Analysis module 200 may include a lexical and syntactic analysis component 205 and a semantic analysis component 210. The analysis module 200 may receive clinical notes 20. The clinical notes 20 may be received in digital form from a memory, for example, memory 105 shown in FIG. 1. The clinical notes 20 may be provided to the lexical and syntactic analysis component 205 for analysis. The lexical and syntactic analysis component 205 may provide a result to the semantic analysis component 210 for further analysis. The result may be one or more data structures stored in digital form. The analysis module 200 may provide one or more EFV triples as an output 25 based on a result of the semantic analysis component 210.

Figure 3:
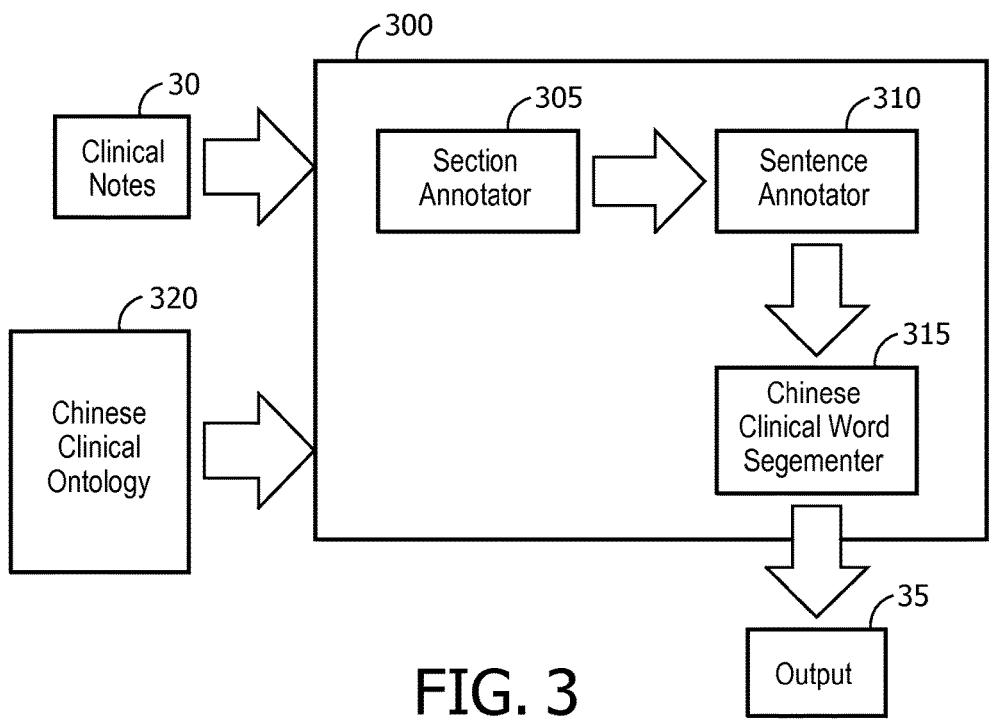
FIG. 3 is a block diagram of a lexical and syntactic analysis component according to an embodiment of the disclosure.

FIG. 3 is a block diagram of a lexical and syntactic analysis component 300 according to an embodiment of the disclosure. The lexical and syntactic analysis component 300 may be used to implement lexical and syntactic analysis component 205 in FIG. 2 in some embodiments. The lexical and syntactic analysis component 300 may include a section annotator 305, a sentence annotator 310, and a Chinese clinical word segmenter 315. The section annotator 305, sentence annotator 310, and/or Chinese clinical word segmenter 315 may include one or more algorithms implemented in hardware and/or software.

The section annotator 305 may identify and annotate sections within clinical notes 30 received by the lexical and syntactic analysis component 300. The clinical notes 30 may include information stored in digital form as one or more strings, values, objects, symbols, and/or other data structures representing words, phrases, characters, and/or sentences. Identifying sections within clinical notes 30 may facilitate output of the final EFV triples organized by corresponding sections, which may allow for faster search queries restricted by section headers. The section annotator 305 may recognize field designations within the digital form of the clinical notes 30 and/or common section headings (e.g. patient information, exam performed, results).

The sentence annotator 310 may identify and annotate sentences within the sections identified by the section annotator 305. In some embodiments, the sentence annotator 310 may be implemented with the Unstructured Information Management Architecture (UIMA). An UIMA framework may run annotator components that may distinguish and annotate sentences within the sections. In some embodiments, the UIMA may be the Apache UIMA. Other UIMA implementations and/or other architectures may be used.

The Chinese clinical word segmenter 315 may segment Chinese characters of each sentence into words. A Chinese Word Segmenter (CWS) tool that utilizes a Chinese clinical ontology 320 (e.g., cardiology ontology, radiology ontology) may be used. The Chinese clinical ontology 320 may be stored in a database, such as database 215 shown in FIG. 2. An example of a CWS tool that may be used with the clinical otology is the FudanNLP CWS tool (X. Qiu, Q. Zhang, X. Huang, "FudanNLP: A Toolkit for Chinese Natural Language Processing," Proceedings of Annual Meeting of the Association for Computational Linguistics, pages 49-54 Aug. 4-9, 2013). Other CWS tools may be used.

The Chinese clinical ontology 320 may include a hierarchical lexical structure that defines concepts expressed by words and/or phrases and are linked with semantic relations. The Chinese clinical ontology 320 may provide information to the CWS tool that may include words and how two or more words are related. Utilizing the Chinese clinical ontology 320 with the CWS tool may improve the precision of Chinese character segmentation. For example, using a general Chinese language ontology, the CWS tool may parse three Chinese characters (three tip valve) as three separate words: three tip valve. In contrast, when utilizing the Chinese clinical ontology 320, the CWS tool may parse the same three characters as two words: tricuspid valve. That is, the Chinese clinical ontology 320 may provide information to the CWS tool of how "three tip," or how "three tip valve" may be related to form a complete concept of "tricuspid valve." While a clinician reviewing the segmented clinical notes may infer the intended meaning of "three tip valve," the clinical notes and/or a section of the clinical notes may not appear as a search result when a clinician searches for the term "tricuspid valve."

The lexical and syntactic analysis component 300 may provide an output 35. In some embodiments, the output 35 may be a data structure that may include the segmented words linked to sentence and/or section annotations. The output 35 may be received by a semantic analysis component, for example semantic analysis component 210 shown in FIG. 2, for further processing.

Figure 4:
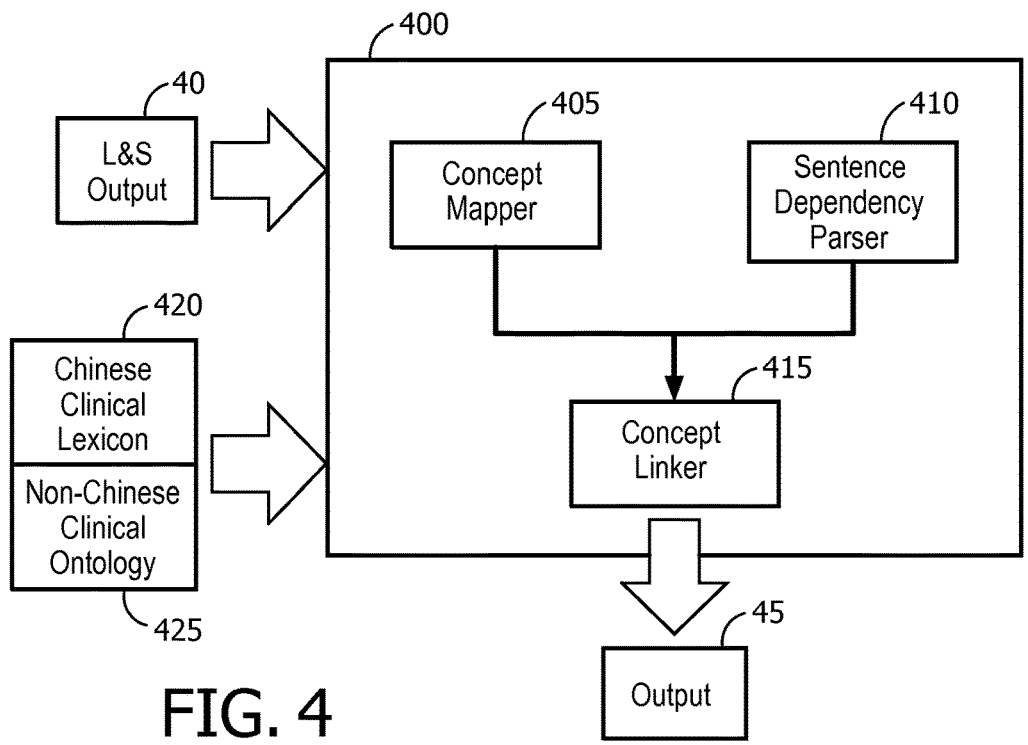
FIG. 4 is a block diagram of a semantic analysis component according to an embodiment of the disclosure.

FIG. 4 is a block diagram of a semantic analysis component 400 according to an embodiment of the disclosure. The semantic analysis component 400 may be used to implement semantic analysis component 210 in FIG. 2 in some embodiments. The semantic analysis component 400 may receive an output 40 from a lexical and syntactic analysis component, for example the output of lexical and syntactic analysis component 300 shown in FIG. 3. The semantic analysis component 400 may include a concept mapper 405, a sentence dependency parser 410, and a concept linker 415. The concept mapper 405, sentence dependency parser 410, and/or concept linker 415 may include one or more algorithms that may be implemented in hardware and/or software.

The concept mapper 405 may extract and map concepts from the words of output 40 to a Chinese clinical lexicon 420. A concept may include one or more words that may be mapped to a single term of the Chinese clinical lexicon 420. The Chinese clinical lexicon 420 may map to equivalent terms from a non-Chinese clinical ontology 425. The Chinese clinical lexicon 420 may include anatomical-site terms and qualifier values that are identified based on the non-Chinese clinical ontology 425 and/or other lexicons. The data in the Chinese clinical lexicon 420 may be organized in a way such that each concept is associated with a concept type, concept identifier (CID), and a non-Chinese clinical ontology identifier (SID). An example of a non-Chinese clinical ontology 425 that may be used is the Systematized Nomenclature of Medicine—Clinical Terms (SNOMED CT). SNOMED CT is an English-based clinical ontology. Other ontologies and/or lexicons (e.g., RadLex) may be used. The non-Chinese clinical otology 425 and Chinese clinical lexicon 420 may be stored in one or more databases accessible to the semantic analysis component 400, such as database 215 shown in FIG. 2.

The sentence dependency parser 410 may parse each sentence of the output 40 to extract grammatical structure of the sentences. A dependency grammar parser may be used. The dependency grammar parser may generate an output that defines how the words and/or phrases in a sentence are related. The output may be a data structure, for example, a numerical value or values assigned to each word and/or phrase that define how the words and/or phrases are related to other words or phrases in the sentence. In some embodiments, the data structure may be a string. Other data structures may be used. The dependency grammar parser may use one or more dependency trees in some embodiments. An example of a dependency grammar parser that may be used is the FudanNLP DePar tool (X. Qiu, Q. Zhang, X. Huang, "FudanNLP: A Toolkit for Chinese Natural Language Processing," Proceedings of Annual Meeting of the Association for Computational Linguistics, pages 49-54 Aug. 4-9, 2013). Other dependency grammar parsers may be used.

The concept linker 415 may generate EFV triples by integrating the extracted and mapped concepts from the concept mapper 405 and the grammatical dependencies identified by the sentence dependency parser 410. The concept linker 415 may derive the relationship links based, at least in part, on the concept types associated with the CID and SID of terms identified in the clinical notes by the concept mapper 405. The concept linker 415 may analyze the concepts by applying one or more rules to the concepts. The rules may be applied based, at least in part, on the grammatical dependencies provided by the data structure provided by the sentence dependency parser 410.

The semantic analysis component 400 may generate an output 45. The output 45 may include one or more EFV triples generated by the concept linker 415.

Figure 5:
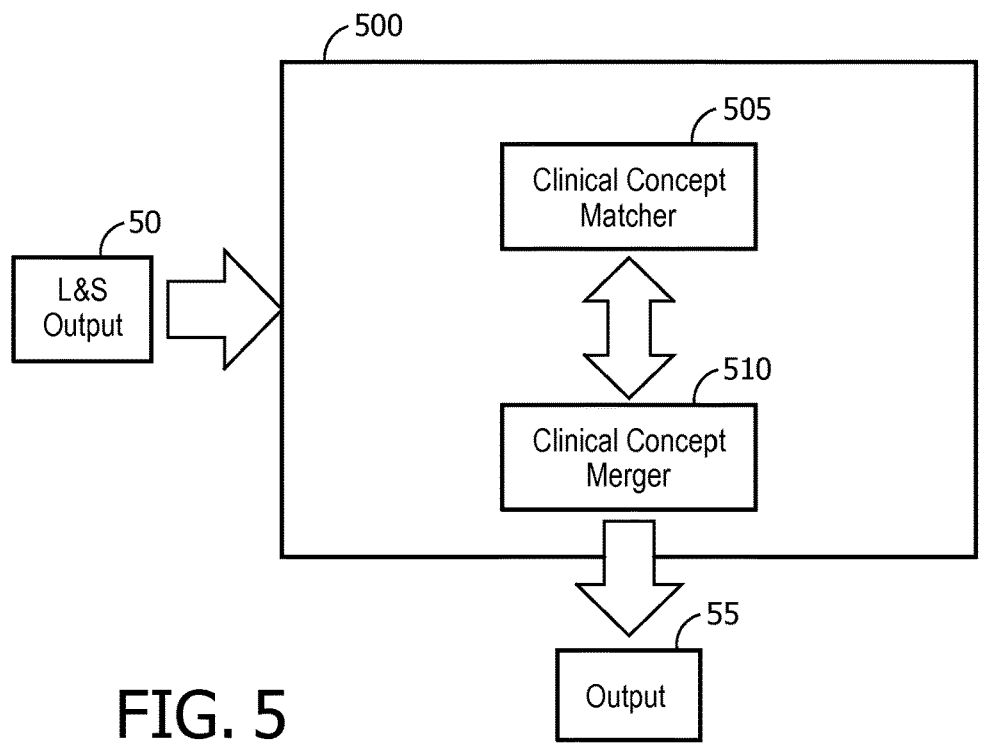
FIG. 5 is a block diagram of a concept mapper according to an embodiment of the disclosure.

FIG. 5 is a block diagram of a concept mapper 500 according to an embodiment of the disclosure. The concept mapper 500 may be used to implement concept mapper 405 in FIG. 4 in some embodiments. The concept mapper 500 may receive an output 50 from a lexical and syntactic analysis component, for example the output 35 of lexical and syntactic analysis component 300 shown in FIG. 3. As described previously, the concept mapper may extract concepts from the clinical notes and map them to a Chinese clinical lexicon (not shown in FIG. 5). The concept mapper 500 may include a clinical concept matcher 505 and a clinical concept merger 510. The clinical concept matcher 505 and clinical concept merger 510 may iteratively process the output 50 to generate results from the Chinese clinical lexicon for matches to concepts extracted from the clinical notes pre-processed by the lexical and syntactic analysis component. In some embodiments, the concept mapper 500 may use exact string matching at the word-level as the base process. Other levels (e.g., phrase, sentence) may be used for the base process.

Clinical concept matcher 505 may utilize a fuzzy concept matching algorithm to identify and map terms in the Chinese clinical lexicon to clinical concepts in the clinical notes which may be separated into clinically meaningful words and phrases. In addition to the fuzzy concept matching, the clinical concept matcher 505 may identify and process acronyms and synonyms.

Fuzzy matching in English language usually refers to the implementation of a specific range of the Levenshtein edit distance between two strings (e.g., a term in the Chinese lexicon and a concept in the clinical notes) that should be mapped. The Levenshtein edit distance refers to the transformation of one string into another by counting the minimum number of required operations (e.g., insertion, deletion, and substitution). However, the edit distance and fuzzy matching for the English language may not be easily adaptable for Chinese clinical documents. Chinese characters may convey more meaning than the combination of English letters, and any minor substitution, insertion, or deletion of a Chinese character may significantly change the meaning of a word. For example, in the case of (early stage) and (late stage), although there is only one character difference in those two words, they have opposite meanings. Therefore, a simple implementation of the English-based edit distance within the range of >=2 may make the fuzzy matching perform poorly with respect to these concepts.

The fuzzy matching utilized by the clinical concept matcher 505 may consider the combination of Chinese characters (words) such that the edit distance implemented is less sensitive to individual characters. That is, the fuzzy string matching algorithm may involve the longest string matching without considering word sequence. For instance, the fuzzy matching algorithm may map (average transvalvular pressure gradient) to (transvalvular average pressure gradient) based on a word-level edit distance of 1, which may be irrespective of the reposition of the individual characters.

Other techniques for Chinese fuzzy matching may be used. The techniques may be used alternatively or in addition to the fuzzy matching described herein. Other techniques may include, but are not limited to, considering phonetic and shape similarity of Chinese characters and infix and prefix match.

The clinical concept merger 510 may analyze the results from the clinical concept matcher 505 to derive the longest sequence of words and/or phrases that may be clinically meaningful and may be mapped to a specific term in the Chinese clinical lexicon. A rule for the concept merger 510 may be that the longest possible concept (e.g., the longest word or string of words) to be mapped to a term in the clinical lexicon must be within the boundaries of a single sentence. The concept merger 510 may sequentially process words in a sentence towards combining clinically meaningful and adjacent words and/or phrases which may be mapped to existing terms in the Chinese clinical lexicon. The clinical concept matcher 505 and concept merger 510 may collectively provide the final mapping of the concepts in the clinical notes to corresponding terms in the Chinese clinical lexicon.

The previous example, (average transvalvular pressure gradient) will be used to illustrate the concept mapping process performed by the concept mapper 500. The clinical lexicon may contain the concepts (average), (transvalvular pressure gradient), and (transvalvular average pressure gradient). A simple concept mapping process may match (average transvalvular pressure gradient) to the term (transvalvular pressure gradient) in the Chinese clinical lexicon. However, another relevant term in the Chinese clinical lexicon (transvalvular average pressure gradient) may not be mapped. In contrast, after processing by a Chinese clinical word segmenter, such as Chinese clinical word segmenter 315 shown in FIG. 3, the concept in the clinical note may be split into two words which may be [average] and [transvalvular pressure gradient]. The result from the Chinese word segmenter may be provided to the clinical concept mapper 500. The clinical concept matcher 505 may map the corresponding terms (average) and (transvalvular pressure gradient) in the Chinese clinical lexicon. The output of the clinical concept matcher 505 may be provided to the concept merger 510. The concept merger 510 may combine (average) and (transvalvular pressure gradient) into a single clinically meaningful concept (average transvalvular pressure gradient) which may then be provided to and re-processed by the concept matcher 505. The clinically meaningful concept may then be mapped to the relevant Chinese clinical lexicon term. The Chinese clinical lexicon may provide mapping to the appropriate non-Chinese term as previously described herein. The output 55 of the concept mapper 500 may be output to a concept linker, for example, concept linker 415 shown in FIG. 4. The output 55 may be a data structure that may include the segmented words of each sentence and/or section with words and/or phrases linked to the appropriate concept. The output 55 may be a separate data structure or output 55 may be additional links applied to the output of the lexical and syntactical analysis component received by the concept mapper 500.

Returning to FIG. 4, the concept linker 415 may connect semantically related anatomical concepts, pathological processes affecting the anatomical concepts, and represent this connection as Entity-Feature-Value (EFV) triples. In some embodiments, the EFV triple may be a data structure that includes three concepts with each concept annotated as an entity, feature, or value. The concepts may be stored as strings and the annotations may be stored as values in some embodiments. Other data structures may be used to store the EFV triple. In some embodiments, sentence-level grammatical dependencies may be used to find semantic relationships between concepts that may belong to an EFV triple. That is, the data structure received from the dependency parser 410, that defines how words in sentences are related, may be used by the concept linker 415 to analyze the data structure received from the concept mapper 405, that includes the words and sentences mapped to concepts, to determine which concepts to combine to form one or more EFV triples. The concept linker 415 may provide additional algorithms to process clinical sub-languages. The additional processing may provide more accurate dependency-based trees when processing sentences in clinical notes.

Each sentence in the clinical notes may contain multiple anatomical concepts and/or descriptions of pathological processes. Although the entity (e.g., anatomical concept) may typically be the subject of a feature (e.g., pathology) and a value (e.g., description, measurement, and/or assessment) located adjacent to one another in a phrase within a sentence, the entity may be the subject of features and/or values represented in other non-adjacent phrases within the same sentence.

The concept linker 415 may apply one or more rules and/or rule sets to the outputs received from the concept mapper 405 and the sentence dependency parser 410. In some embodiments, two rule sets may be applied. The concept linker 415 may apply a set of fragment resolution rules and a set of entity tracing rules.

The fragment resolution rules may resolve fragments in parentheses, fragments before or after punctuation, and/or fragments with qualifiers.

Figure 6:
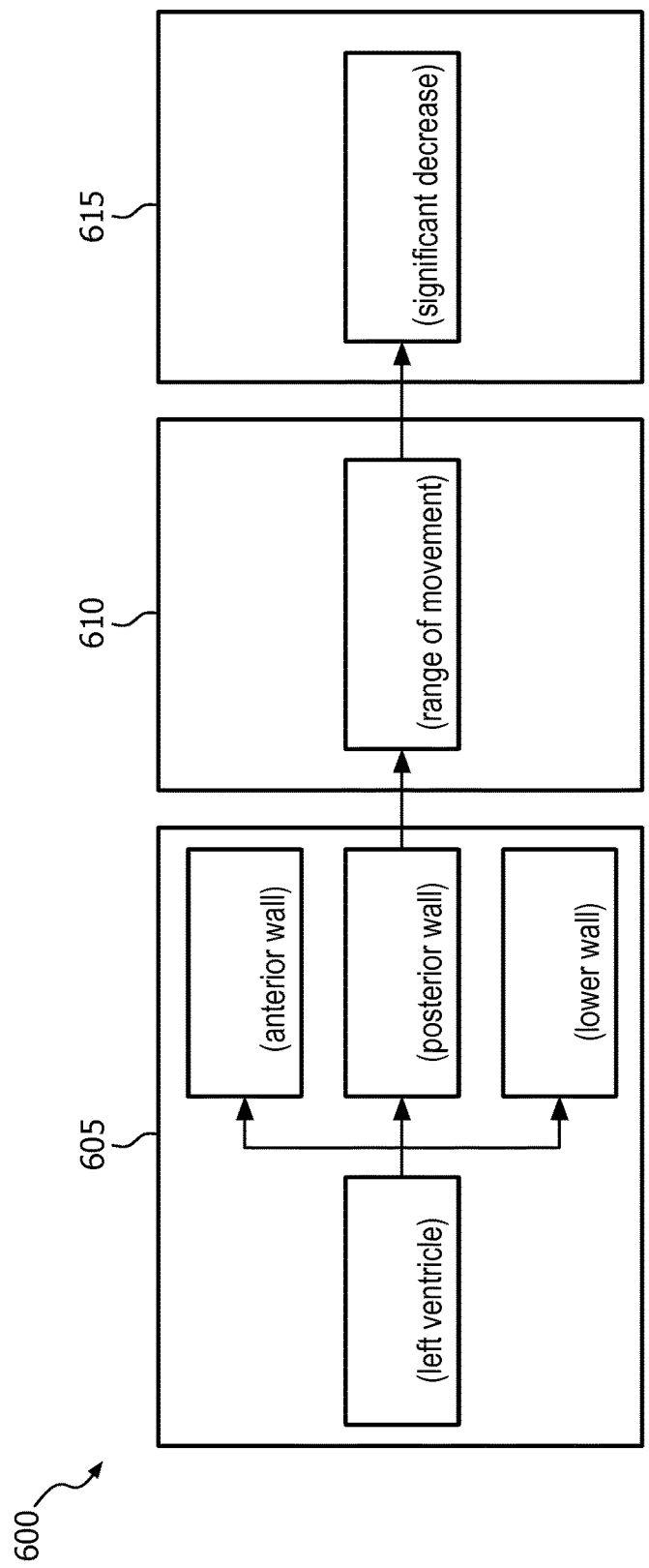
FIG. 6 is an illustration of an EFV according to an embodiment of the disclosure.

Terms within parentheses may initially be ignored when extracting concepts. A fragment resolution rule may allow terms within parentheses to be considered alternative terms for the terms appearing prior to the parentheses in the sentence. For example, in the phrase, (left ventricle anterior (posterior, lower) range of movement significantly decreased), ignoring words within the parentheses, (anterior wall) may be captured as a concept. By replacing (anterior) with either (posterior) or (lower), new concepts (posterior wall) and (lower wall) may be found in the Chinese clinical lexicon (not shown in FIG. 4) by the concept linker 415 to generate the EFV triple. FIG. 6 is an illustration of the EFV 600 for this example according to an embodiment of the disclosure. The EFV 600 includes the entity 605, feature 610, and value 615.

Some concepts may not be accurately captured because they are separated from the rest of the phrase by punctuation and/or hyphens. A punctuation fragment resolving rule may be applied that may capture such concepts. The rule may replace and concatenate the unidentified concepts, when the phrase which includes the unidentified concept has the following patterns: (1) identified concepts+punctuation+unidentified word; and/or (2) unidentified word+punctuation+identified concept. For example, a sentence in a clinical note may contain the concepts, (mitral–tricuspid valver angioplasty) (Aortic valve moderate–severe regurgitation), (mitral–tricuspid valve angioplasty), and (internal diameter of left atrial, ventricle is still large). A simple concept matching may identify the terms (severe), (tricuspid valve), and (left atrial). However, concepts such as (moderate), (two), and (ventricle) may not be identified because they are separated from the rest of the phrase by punctuations and/or hyphens. Applying the punctuation resolving rule, new phrases may be formed and may be processed so that (two) may be concatenated with (tricuspid valve) by replacing (three) with (two). Then (mitral) may be matched to the corresponding term in the Chinese clinical lexicon. In some embodiments, the concept linker 415 may provide the new phrases based on the punctuation fragment resolving rule to a clinical concept matcher, such as clinical concept matcher 505 shown in FIG. 5, to match to the corresponding term in the Chinese clinical lexicon. The clinical concept matcher may then provide the output to the concept linker 415.

Multiple qualifiers are often associated with a single concept. In these cases, each individual qualifier may be distinctly combined to the concept in order to capture the accurate meaning of the statement. For example, in the statements, (no obvious enlargement on left or right coronary artery) and (left and right ventricle internal diameter enlargement), the anatomical structure includes multiple qualifiers (e.g. right and left) and a single concept (e.g. coronary artery). Following these examples, the concept linker 415 would generate the EFV triplets: "left coronary artery–enlargement–no obvious," "right coronary artery–enlargement–no obvious," "left ventricle–internal diameter–enlargement," and "right ventricle–internal diameter–enlargement."

In some cases, it may not be possible to extract an EFV triple from a phrase and/or set of phrases in a single sentence of a clinical note. In these cases, previous sentences and/or phrases may be traced to link entities with the appropriate features and/or values to form the EFV triples by applying entity tracing rules. Entity tracing rules may be conjunction-based, direction word-based, and/or parent-child based. In some embodiments, the entity tracing rules may be equivalent to co-reference resolution.

Figure 7:
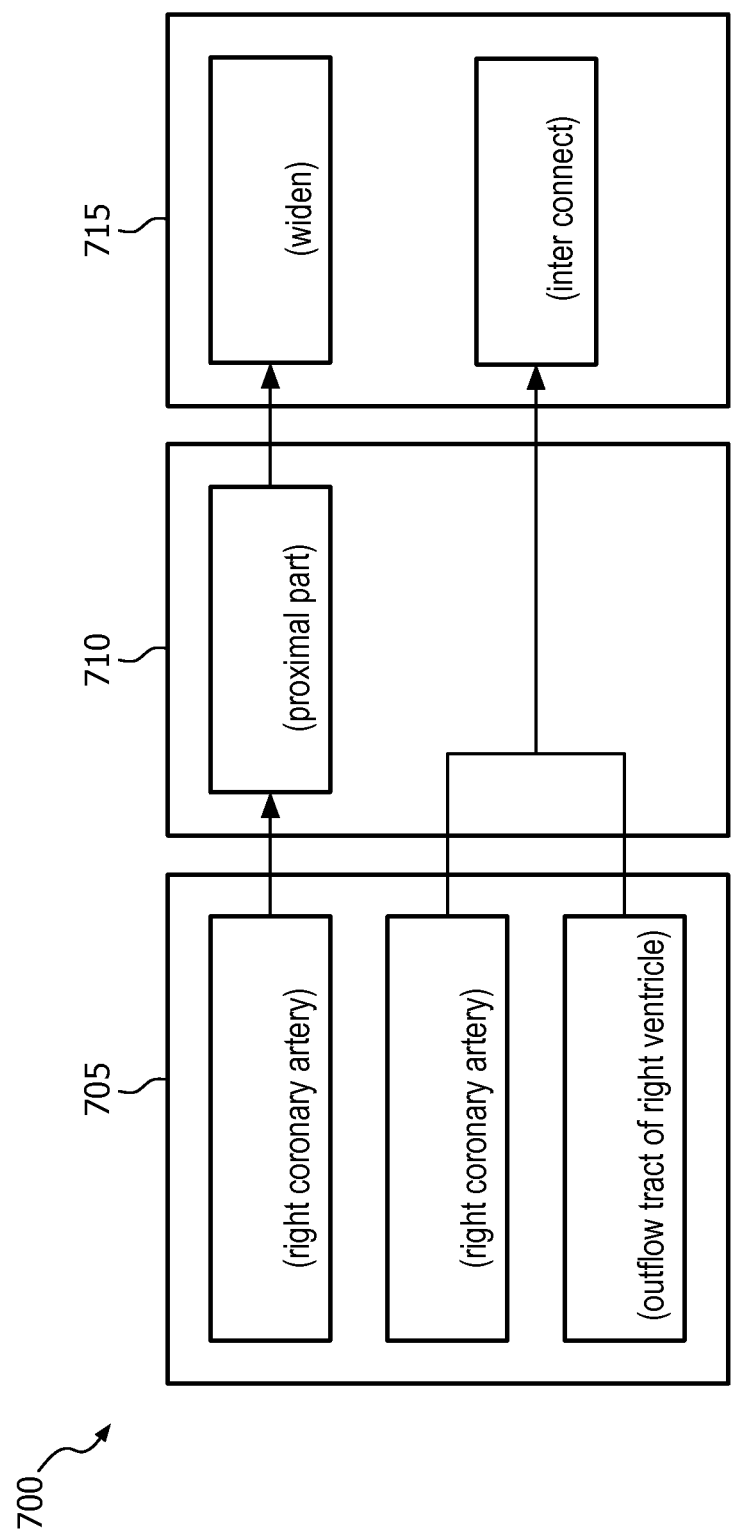
FIG. 7 is an illustration of an EFV according to an embodiment of the disclosure.

When a phrase in a clinical note is structured as a conjunction word+entity, the conjunction word is an indicator that another concept may be connected with the entity. By tracing back to the previous phrase and/or sentence, an additional concept may be found associated with the entity. The additional concept may be used to form an EFV triple. For example, (right coronary artery widen, and connected with outflow tract of right ventricle), the conjunction word (and) may indicate another concept is connected with the entity (right ventricle) in this phrase. By tracing back to the previous phrases and/or sentences, (right coronary artery) may be found, which may be included in the EFV triple as well. FIG. 7 is an illustration of the EFV 700 for this example according to an embodiment of the disclosure. The EFV 700 includes the entity 705, feature 710, and value 715. It is to be appreciated that any one of the above embodiments or processes may be combined with one or more other embodiments and/or processes or be separated and/or performed amongst separate devices or device portions in accordance with the present systems, devices and methods.

Figure 8:
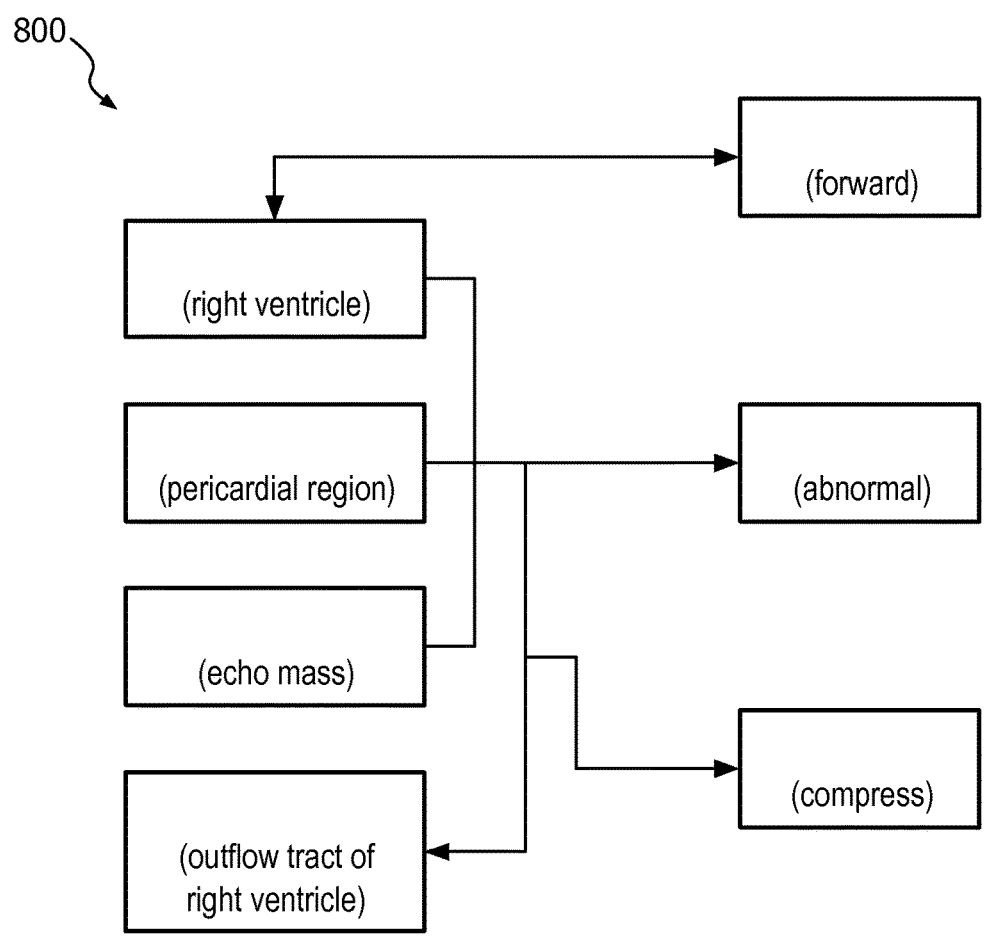
FIG. 8 is an illustration of tracing entities based on direction words according to an embodiment of the disclosure.

When a phrase and/or sentence of a clinical note includes one or more direction words, the direction words may indicate that an entity in a previous phrase and/or sentence may be linked to form an EFV triple. For example, in the phrase (pericardium in front of the right ventricle detect abnormal echo mass), (backwards compression outflow tract of right ventricle)", the direction word (backwards) may indicative that the concept linker 415 may trace to a previously stated concept to determine the appropriate entity for an EFV triple. FIG. 8 is an illustration of an example of tracing entities 800 based on direction words according to an embodiment of the disclosure. As shown, direction word (forward) is traced back and linked to (right ventricle) rather than incorrectly linking to (pericardium).

In some instances, an identified entity in a phrase and/or sentence in a clinical note may be a 'child' linked to a 'parent' entity within the same sentence. That is the child entity may be a sub-portion of the parent entity. For example, a child entity may be a specific portion of an anatomical site (e.g., lobe of a lung). Generating the appropriate EFV triple may be achieved by tracing back to retrieve the parent entity from one or more phrases in a sentence. For example, in the phrases, (aortic valve clover, edge of the valve thickening), the child entity (valve) may be linked with the parent concept (aorta).

In some instances, the EFV triple may omit a feature and/or value from the EFV triple. For example, a clinical note may indicate "aorta normal." In this example, only the entity and value are present. In another example, a clinical note may indicate "coronary artery thickness." In this example, only the entity and feature are present.

By applying rules and/or rule sets, the concept linker 415 may output EFV triples. The EFV triples may be output to a memory, a database, and/or a display for viewing by a clinician. The EFV triples may be used for structured queries to databases to facilitate data mining, patient outcome analysis, and/or advanced patient and population-level visualization. The EFV triples may be used for other applications.

Figure 9:
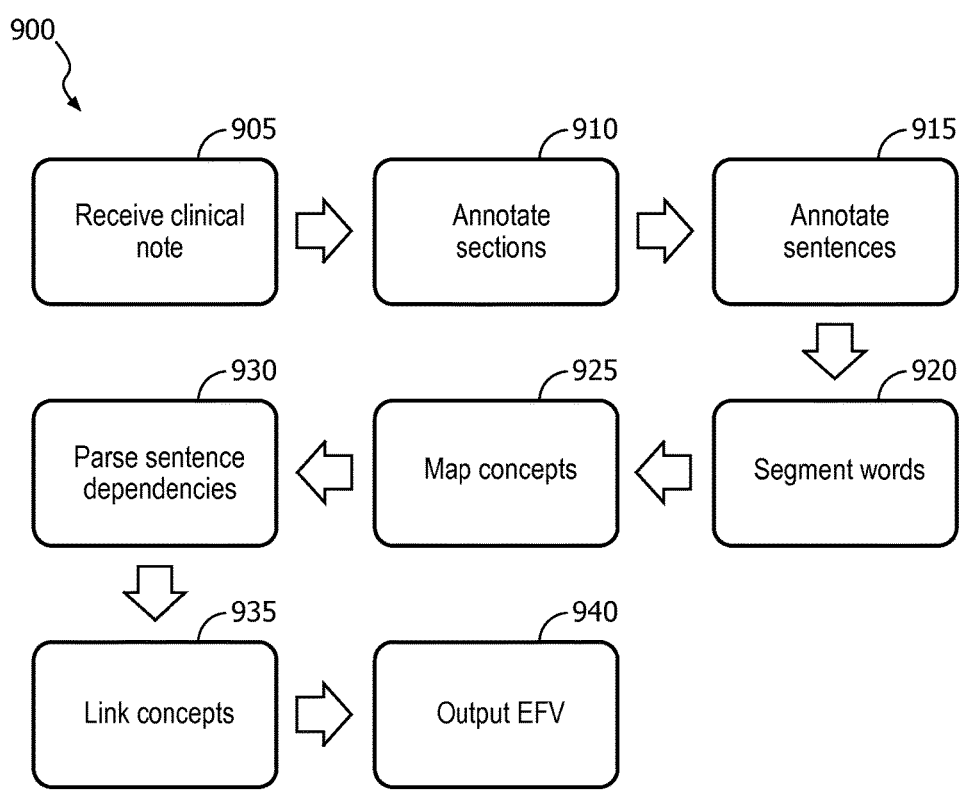
FIG. 9 is a flow chart of a method according to an embodiment of the disclosure.

FIG. 9 is a flow chart of a method 900 according to an embodiment of the disclosure. In some embodiments, the method 900 may be performed by a computer system. In some embodiments, the method 900 may be performed by processor 115 shown in FIG. 1. In some embodiments, processor 115 may include analysis module 200. In some embodiments, processor 115 may include one or more processors. Each processor may include analysis module 200 and/or a portion of analysis module 200. For example, a first processor may include the lexical and syntactic analysis component 205 and a second processor may include the semantic analysis component 210. Other configurations may be used.

At Step 905, a clinical note may be received in digital form. In some embodiments, the clinical note is stored in a computer-readable memory. At Step 910, sections of the clinical note may be identified and annotated. In some embodiments, Step 910 may be performed by section annotator 305 shown in FIG. 3. At Step 915 sentences within the sections may be identified and annotated. In some embodiments, Step 915 may be performed by sentence annotator 310 shown in FIG. 3. At Step 920, Chinese characters within sentences may be segmented into words. In some embodiments, Step 920 may be performed by a Chinese clinical word segmenter 315 shown in FIG. 3. Sentences may include one or more words and one or more phrases.

At Step 925, the words within sentences and sentences within sections may be analyzed for concepts and the concepts may be mapped to a Chinese clinical lexicon. In some embodiments, Step 925 may be performed by concept mapper 405 shown in FIG. 4. At Step 930, the sentences may be parsed for grammatical dependencies. In some embodiments, Step 930 may be performed by sentence dependency parser 410 shown in FIG. 4. In some embodiments, Steps 925 and 930 may be performed in parallel. In some embodiments, Step 930 may be performed before Step 925.

At Step 935, the mapped concepts and grammatical dependencies are integrated to link concepts to generate entity-feature-value (EFV) triples. In some embodiments, Step 935 is performed by concept linker 415 shown in FIG. 4. At Step 940, one or more EFV triples are output. The EFV triples may be provided to a memory, a database, and/or a display at Step 940. In some embodiments, the EFV triples are provided to a remote computer system.

Of course, it is to be appreciated that any one of the above embodiments or processes may be combined with one or more other embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A system, including one or more electronic processors configured to:
   receive a cardiology note;
   identify and annotate a section within the cardiology note;
   identify and annotate a sentence within the section;
   extract a grammatical structure of the sentence;
   determine words in the sentence;
   map the words to concepts; and
   based on both: (i) the grammatical structure of the sentence, and (ii) the concepts, generate an entity-feature-value (EFV) triple, the EFV triple including:
   an entity;
   a feature including a property of the entity; and
   a value of the feature;
   wherein the EFV triple is configured to be used as a search term to access the cardiology note in a clinical database, and the one or more electronic processors are further configured to:
   provide the EFV to the clinical database; and
   search the clinical database with the search term to find the cardiology note, wherein the search is restricted by a section header:
   wherein:
   the entity is a child linked to a parent;
   the child is a specific portion of an anatomical site; and
   the one or more electronic processors are further configured to find the parent by tracing back from the child.

2. The system of claim 1, further comprising a remote computer system configured to be accessible to the one or more electronic processors, wherein the processor is configured to provide the EFV triple to the remote computer system.

3. The system of claim 1, wherein the one or more electronic processors are further configured to:
   initially ignore a word in parenthesis; and
   consider the word in parenthesis as an alternative term when generating the EFV triple.

4. The system of claim 1, wherein the value includes a measurement of the feature.

5. The system of claim 1, wherein the value includes a descriptor of the feature.

6. The computer system of claim 1, wherein the entity further includes a site.

7. The computer system of claim 1, wherein the feature further includes a pathology of the entity.

8. The computer system of claim 1, wherein the property of the entity is a thickness of the entity.

9. A method, performed by one or more electronic processors, comprising:
   receiving a clinical note;
   identifying and annotate a section within the clinical note;
   identifying and annotate a sentence within the section;
   extracting a grammatical structure of the sentence;
   determining words in the sentence;
   mapping the words to concepts; and
   based on both: (i) the grammatical structure of the sentence, and (ii) the concepts, generating an entity-feature-value (EFV) triple, the EFV triple including:
   an entity;
   a feature including a property of the entity; and
   a value including a measurement of the feature; wherein:
   the entity is a child linked to a parent;
   the child is a specific portion of an anatomical site; and
   the parent is found by tracing back from the child.

10. The method of claim 9, wherein the EFV triple is configured to be used as a search term to access the clinical note in a clinical database, and the method further comprises:
    providing the EFV to the clinical database; and
    searching the clinical database with the search term to find the clinical note.

11. The method of claim 9, further comprising:
    initially ignoring a word in parenthesis; and considering the word in parenthesis as an alternative term when generating the EFV triple.

12. A system, including one or more electronic processors configured to:
receive a clinical note;
identify and annotate a section within the clinical note;
identify and annotate a sentence within the section;
extract a grammatical structure of the sentence;
determine words in the sentence;
map the words to concepts;
determine that it is not possible to generate an entity-feature-value (EFV) triple from a single sentence; and
use a previous sentence to link an entity with a feature and a value by applying one or more entity tracing rules to generate an EFV triple, wherein an entity tracing rule of the one or more entity tracing rules is conjunction-based;
wherein the EFV triple is configured to be used as a search term to access the clinical note in a clinical database, and the one or more electronic processors are further configured to:
provide the EFV to the clinical database; and
search the clinical database with the search term to find the clinical note, wherein the search is restricted by a section header.

13. The system of claim 12, further comprising a remote computer system configured to be accessible to the one or more electronic processors, wherein the processor is configured to provide the EFV triple to the remote computer system.

14. The system of claim 12, wherein:
another entity tracing rule of the one or more entity tracing rules is direction-based.

15. The system of claim 12, wherein the one or more electronic processors are further configured to:
initially ignore a word in parenthesis; and
consider the word in parenthesis as an alternative term when generating the EFV triple.

16. The system of claim 12, wherein the EFV includes:
a feature including a property of the entity; and
a value including a measurement of the feature.

17. The system of claim 12, wherein
the entity is a child linked to a parent; and
the one or more electronic processors are further configured to trace back from the child to find the parent.

\* \* \* \* \*